United States Patent
Albero et al.

(10) Patent No.: US 12,063,238 B2
(45) Date of Patent: Aug. 13, 2024

(54) PREVENTING UNAUTHORIZED PARTICIPATION IN COLLABORATIVE AUGMENTED REALITY AND VIRTUAL REALITY MEETINGS

(71) Applicant: Bank of America Corporation, Charlotte, NC (US)

(72) Inventors: George Albero, Charlotte, NC (US); Maharaj Mukherjee, Poughkeepsie, NY (US); Deborah Mayers, Charlotte, NC (US); Jinna Kim, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 326 days.

(21) Appl. No.: 17/526,177

(22) Filed: Nov. 15, 2021

(65) Prior Publication Data

US 2023/0156023 A1     May 18, 2023

(51) Int. Cl.
*H04L 9/40*     (2022.01)
*G06F 18/214*     (2023.01)
(Continued)

(52) U.S. Cl.
CPC ........ *H04L 63/1425* (2013.01); *G06F 18/214* (2023.01); *G06F 18/22* (2023.01);
(Continued)

(58) Field of Classification Search
CPC . H04L 63/1425; H04L 63/1441; H04L 63/10; H04L 63/0861; H04L 65/403;
(Continued)

(56) References Cited

U.S. PATENT DOCUMENTS 9,667,915 B2   5/2017  Baldelli et al.
9,681,154 B2   6/2017  Tian
(Continued)

OTHER PUBLICATIONS

Datta et al. "Virtual Reality Mobile Application Testing in a 5G Testbed" Eleventh International Conference on Ubiquitous and Future Networks, Jul. 2019, pp. 455-459.
(Continued)

*Primary Examiner* — Dhairya A Patel
(74) *Attorney, Agent, or Firm* — Banner & Witcoff, Ltd.

(57) ABSTRACT

Aspects of the disclosure relate to computing hardware and software for enhancing collaborative experience security. A computing platform may receive, from a user device, a request to join an enhanced reality collaborative experience involving use of an avatar in an AR or VR environment. The computing platform may verify an authorization channel for the user device, and may grant the user device access to the enhanced reality collaborative experience. The computing platform may receive biometric information corresponding to the user. Using data collected by the user device and the biometric information, the computing platform may perform anomaly detection to detect anomalies in the avatar's participation in the enhanced reality collaborative experience. In response to detecting the anomalies, the computing platform may perform one or more security actions for the enhanced reality collaborative experience.

18 Claims, 9 Drawing Sheets

(51) Int. Cl.
*G06F 18/22* (2023.01)
*G06V 40/20* (2022.01)
*H04L 65/403* (2022.01)

(52) U.S. Cl.
CPC .............. *G06V 40/25* (2022.01); *G06V 40/28* (2022.01); *H04L 63/0861* (2013.01); *H04L 63/10* (2013.01); *H04L 63/1441* (2013.01); *H04L 65/403* (2013.01)

(58) Field of Classification Search
CPC ........ G06V 40/28; G06V 40/25; G06F 18/22; G06F 18/214
See application file for complete search history.

(56) References Cited

U.S. PATENT DOCUMENTS

| | | | |
|---|---|---|---|
| 9,729,827 B2 | 8/2017 | Vendrow | |
| 9,860,487 B2 | 1/2018 | Kim et al. | |
| 9,912,907 B2 | 3/2018 | De Magalhaes | |
| 9,942,519 B1 | 4/2018 | Pan et al. | |
| 9,967,519 B1 | 5/2018 | Lin | |
| 9,992,243 B2 | 6/2018 | DeLuca et al. | |
| 10,334,208 B2 | 6/2019 | Pan et al. | |
| 10,404,943 B1 | 9/2019 | Fieldman | |
| 10,447,745 B2 | 10/2019 | Vuong | |
| 10,609,438 B2 * | 3/2020 | Branch | ............ H04N 21/41407 |
| 10,715,765 B2 | 7/2020 | Vendrow | |
| 10,768,885 B1 | 9/2020 | Fieldman | |
| 10,771,740 B1 | 9/2020 | Reynolds et al. | |
| 10,771,741 B1 | 9/2020 | Reynolds et al. | |
| 10,931,676 B2 | 2/2021 | Pantazelos | |
| 10,999,227 B1 | 5/2021 | Yan | |
| 11,010,810 B1 | 5/2021 | Pylant | |
| 11,032,516 B1 | 6/2021 | Walters et al. | |
| 11,055,055 B1 | 7/2021 | Fieldman | |
| 11,477,509 B2 * | 10/2022 | Branch | .............. H04N 21/8146 |
| 11,816,231 B2 * | 11/2023 | Albero | .................. G06F 21/604 |
| 2008/0317292 A1 * | 12/2008 | Baker | .................... G06V 40/12 382/115 |
| 2014/0333414 A1 * | 11/2014 | Kursun | .................. G06V 40/50 340/5.82 |
| 2015/0052587 A1 | 2/2015 | O'Neill et al. | |
| 2019/0109878 A1 * | 4/2019 | Boyadjiev | .............. G06N 5/022 |
| 2020/0382531 A1 * | 12/2020 | Albero | ................ H04L 63/1425 |
| 2021/0074068 A1 * | 3/2021 | Spivack | .................. G06N 20/00 |
| 2021/0314408 A1 * | 10/2021 | Hodge | .................... G06F 21/32 |

OTHER PUBLICATIONS

Batuwanthudawa et al. "Real-Time Location based Augmented Reality Advertising Platforms" 2nd International Conference on Advancements in Computing, Dec. 2020, pp. 174-179.
Dec. 28, 2023—(US) Notice of Allowance—U.S. Appl. No. 17/536,256.

* cited by examiner

PREVENTING UNAUTHORIZED PARTICIPATION IN COLLABORATIVE AUGMENTED REALITY AND VIRTUAL REALITY MEETINGS

BACKGROUND

Aspects of the disclosure relate to computing hardware and software, particularly distributed computing hardware and software for collaborative virtual experiences. When individuals participate in collaborative virtual experiences (e.g., virtual meetings, video games, and/or other experiences), they may, in some instances, use an avatar to represent themselves (e.g., rather than displaying an accurate photo, video feed, and/or otherwise displaying their physical appearance). In doing so, the individuals may effectively conceal their physical appearance from other participants. This may, in some instances, allow unauthorized participants to engage in collaborative virtual experiences if they are able to access an account or other credentials for an authorized participant. For example, an unauthorized participant may access a collaborative virtual experience using the credentials of an authorized participant. In these instances, the unauthorized access may remain undetected as the unauthorized participant's physical appearance may be represented by an avatar of the authorized participant (or otherwise concealed). As such virtual collaborative experiences become more prevalent, it is therefore increasingly important to improve methods for detection and prevention of unauthorized participation.

SUMMARY

Aspects of the disclosure provide effective, efficient, scalable, and convenient technical solutions that address and overcome the technical problems associated with developing and implementing computer hardware and software that can identify anomalous behavior during enhanced reality experiences and thereby provide increased security. In accordance with one or more embodiments of the disclosure, a computing platform comprising at least one processor, a communication interface, and memory storing computer-readable instructions may receive, from a user device, a request to join an enhanced reality collaborative experience involving use of an avatar in one of: a virtual reality environment or an augmented reality environment. The computing platform may verify an authorization channel for the user device. The computing platform may grant the user device access to the enhanced reality collaborative experience. The computing platform may receive, from a biometric data collection device of a user of the user device, biometric information corresponding to the user. The computing platform may perform, using data collected by the user device and the biometric information corresponding to the user received from the biometric data collection device, anomaly detection to detect one or more anomalies in the avatar's participation in the enhanced reality collaborative experience from anticipated participation behaviors of a valid user of the avatar. In response to detecting the one or more anomalies in the avatar's participation in the enhanced reality collaborative experience, the computing platform may perform one or more security actions for the enhanced reality collaborative experience.

In one or more instances, the biometric data collection device may be connected to the user device, and receiving the biometric information corresponding to the user may include receiving, from the user device, the biometric information corresponding to the user. In one or more instances, receiving the biometric information corresponding to the user may include receiving, directly from the biometric data collection device, the biometric information corresponding to the user.

In one or more instances, performing the one or more security actions may include one or more of: removing the user from the enhanced reality collaborative experience, moving the user to a waiting room of the enhanced reality collaborative experience, prompting the user to re-authenticate to the enhanced reality collaborative experience, sending a notification to a host of the enhanced reality collaborative experience indicating the detected one or more anomalies, and/or performing other security actions. In one or more instances, the data collected by the user device may be one or more of: video data, image data, audio data, and/or other data.

In one or more instances, detecting the one or more anomalies may include feeding the video data into an anomaly detection model and identifying, using the anomaly detection model, that the video data includes anomalous movement patterns for the user. In one or more instances, the computing platform may receive historical biometric and pattern information for the user. The computing platform may train, using the historical biometric and pattern information for the user, the anomaly detection model to identify differences between baseline biometric and pattern information for the user and received biometric and pattern information for the user, which may include identifying the differences between: 1) the baseline biometric and pattern information for the user, and 2) the data collected by the user device and the biometric information corresponding to the user.

In one or more instances, the computing platform may continuously, throughout a duration of the enhanced reality collaborative experience and for all participants of the enhanced reality collaborative experience: 1) receive biometric information and other data corresponding to the participants, and 2) perform anomaly detection for the participants. In one or more instances, the enhanced reality collaborative experience may be one of: a virtual meeting, a virtual training session, a test taking session, or a collaborative academic session. In one or more instances, performing the anomaly detection may include analyzing one or more of: hand movement of the avatar, a dominant hand of the avatar, a running gait of the avatar, a head turn motion of the avatar, speech patterns of the user, or other movements of the user.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to an improved process for ensuring security in collaborative virtual experiences. In some instances, avatars may be used in these collaborative virtual experiences to represent an individual. Since it might not be known whether or not the actual participant is real, it may be difficult to ensure that someone using an avatar is actually an authorized participant when participating in such collaborative virtual experiences or alternatively accessing the avatar without authorization (e.g., to spoof and/or otherwise impersonate another user).

Accordingly, one or more aspects of the disclosure relate to using a separate authorization channel for each participant that is independent of the quality of the 5G network, and using a token to open a channel of participation on an augmented reality (AR) and/or virtual reality (VR) environment on a 5G network once authentication is complete. In addition, anomaly detection may be performed. For example, the AR/VR system may employ an engine to detect anomalies of the user. In some instances, biometric sensors, a computer interface, an XR safety initiative (XRSI) tool and/or other devices may be used to identify an individual based on personal information. Then, risk scoring may be used to take action in real time with respect to an anomalous user (e.g., put them in a waiting room, log them off, send an alert based on a risk factor, and/or perform other actions).

These and other features are described in further detail below.

Figure 1A:
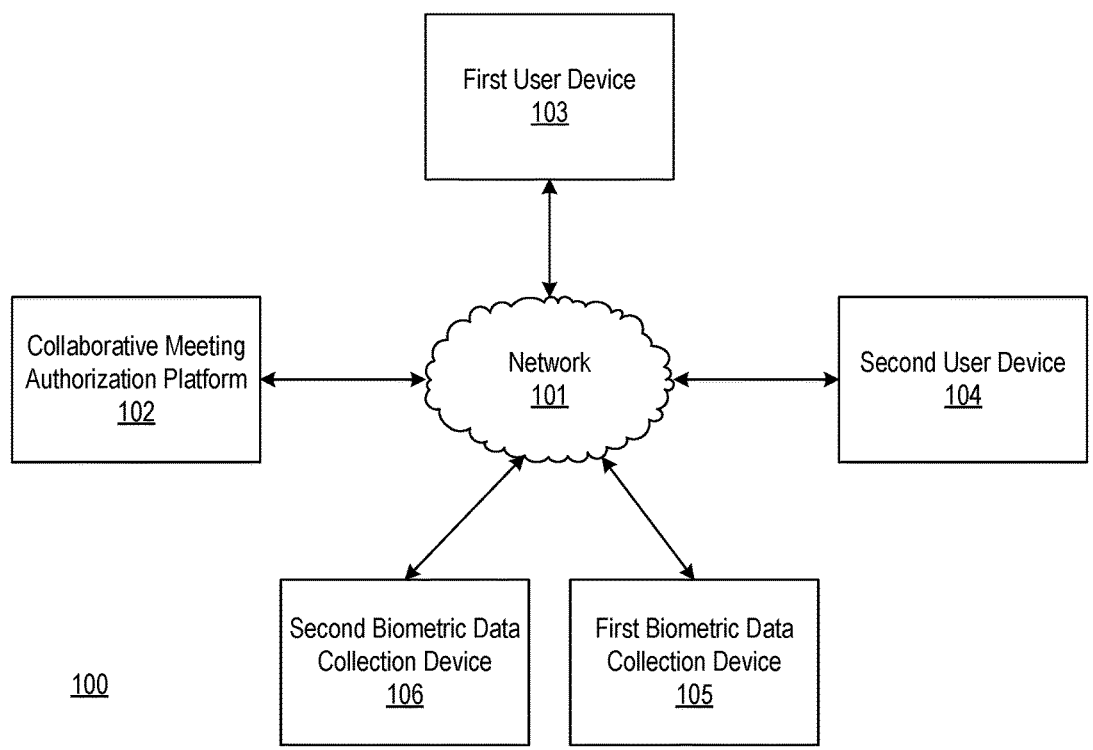
FIGS. 1A-1B depict an illustrative computing environment configured to prevent unauthorized participation in collaborative AR and VR experiences in accordance with one or more example embodiments.
Figure 1B:
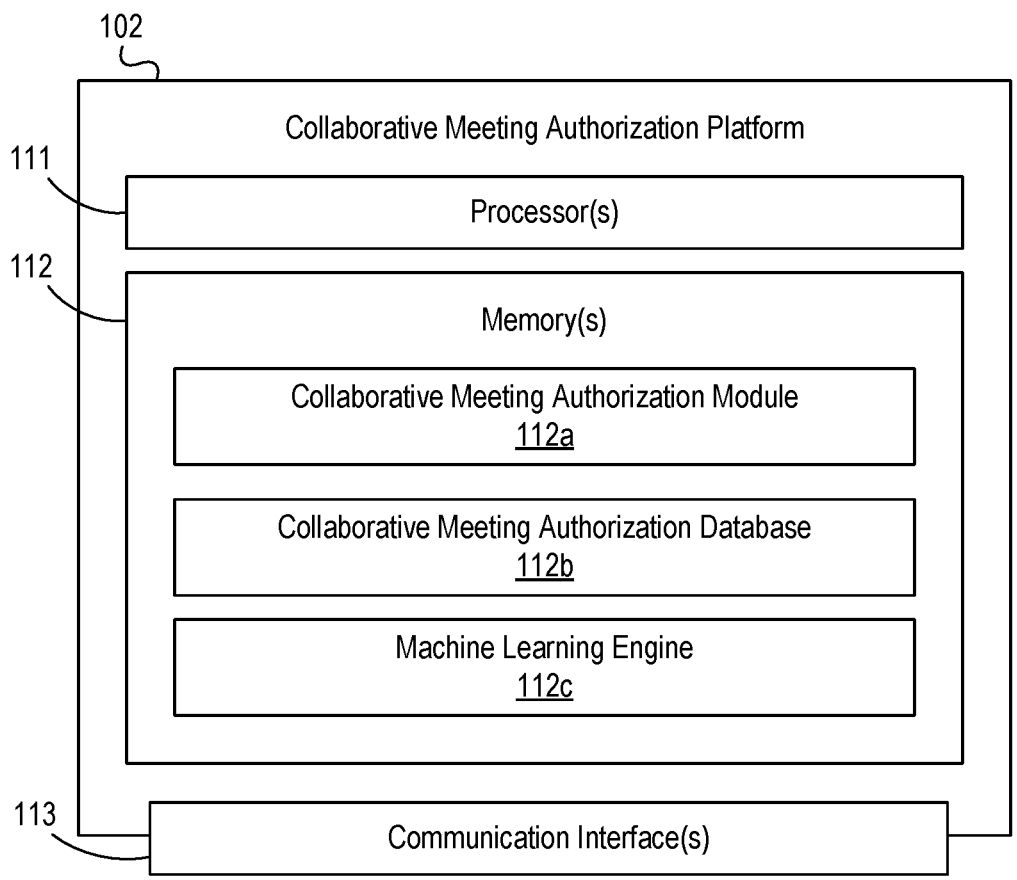

FIGS. 1A-1B depict an illustrative computing environment configured to prevent unauthorized participation in collaborative AR and VR experiences in accordance with one or more example embodiments. Referring to FIG. 1A, computing environment 100 may include one or more computer systems. For example, computing environment 100 may include collaborative meeting authorization platform 102, first user device 103, second user device 104, first biometric data collection device 105, and second biometric data collection device 106.

As described further below, collaborative meeting authorization platform 102 may be a computer system that includes one or more computing devices (e.g., servers, server blades, or the like) and/or other computer components (e.g., processors, memories, communication interfaces) that may be used to host collaborative enhanced reality experiences (e.g., VR experiences, AR experience, and/or other experiences). In some instances, the collaborative meeting authorization platform 102 may be configured to train, maintain, and/or otherwise implement an anomaly detection model that may analyze biometric data and/or other data to identify anomalous behavior for participants in the enhanced reality experiences. If anomalous behavior is detected, the collaborative meeting authorization platform 102 may be configured to perform one or more security actions accordingly.

First user device 103 may be a laptop computer, desktop computer, mobile device, tablet, smartphone, wearable device, headset (e.g., VR headset), glasses (e.g., AR glasses), and/or other device that may be used by an individual to host or otherwise access collaborative virtual experiences. In some instances, the first user device 103 may be configured to collect interaction data/information and provide this interaction data/information to the collaborative meeting authorization platform 102. In some instances, first user device 103 may be configured to display one or more user interfaces (e.g., collaborative virtual experience interfaces, warning interfaces, and/or other interfaces).

Second user device 104 may be a laptop computer, desktop computer, mobile device, tablet, smartphone, wearable device, headset (e.g., VR headset), glasses (e.g., AR glasses), and/or other device that may be used by an individual to host or otherwise access collaborative virtual experiences. In some instances, the second user device 104 may be configured to collect interaction data/information and provide this interaction data/information to the collaborative meeting authorization platform 102. In some instances, second user device 104 may be configured to display one or more user interfaces (e.g., collaborative virtual experience interfaces, warning interfaces, and/or other interfaces).

First biometric data collection device 105 may be a wristband, smartwatch, eye sensor, biometric sensor, mobile device, or other wearable/non-wearable device or sensor that may be used by an individual to collect biometric data. In some instances, the first biometric data collection device 105 may be configured to provide the biometric data to the collaborative meeting authorization platform 102 to facilitate participation in collaborate enhanced reality experiences. In some instances, the first biometric data collection device 105 may communicate directly with the collaborative meeting authorization platform 102. In other instances, the first biometric data collection device 105 may be connected to the first user device 103 and may communicate with the collaborative meeting authorization platform 102 via the first user device 103.

Second biometric data collection device 106 may be a wristband, smartwatch, eye sensor, a biometric sensor, mobile device, or other wearable/non-wearable device or sensor that may be used by an individual to collect biometric data. In some instances, the second biometric data collection device 106 may be configured to provide the biometric data to the collaborative meeting authorization platform 102 to facilitate participation in collaborative enhanced reality experiences. In some instances, the second biometric data collection device 106 may communicate directly with the collaborative meeting authorization platform 102. In other instances, the second biometric data collection device 106 may be connected to the second user device 104 and may communicate with the collaborative meeting authorization platform 102 via the second user device 104.

Computing environment 100 also may include one or more networks, which may interconnect collaborative meeting authorization platform 102, first user device 103, second user device 104, first biometric data collection device 105, and/or second biometric data collection device 106. For example, computing environment 100 may include a network 101 (which may interconnect, e.g., collaborative meeting authorization platform 102, first user device 103, second user device 104, first biometric data collection device 105, and/or second biometric data collection device 106). In some instances, the network 101 may be a 5G network and/or include one or more 5G networks.

In one or more arrangements, collaborative meeting authorization platform 102, first user device 103, second user device 104, first biometric data collection device 105, and/or second biometric data collection device 106 may be any type of computing device capable of sending and/or receiving requests and processing the requests accordingly. For example, collaborative meeting authorization platform 102, first user device 103, second user device 104, first biometric data collection device 105, second biometric data collection device 106, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of collaborative meeting authorization platform 102, first user device 103, second user device 104, first biometric data collection device 105, and/or second biometric data collection device 106 may, in some instances, be special-purpose computing devices configured to perform specific functions.

Referring to FIG. 1B, collaborative meeting authorization platform 102 may include one or more processors 111, memory 112, and communication interface 113. A data bus may interconnect processor 111, memory 112, and communication interface 113. Communication interface 113 may be a network interface configured to support communication between collaborative meeting authorization platform 102 and one or more networks (e.g., network 101, or the like). Memory 112 may include one or more program modules having instructions that when executed by processor 111 cause collaborative meeting authorization platform 102 to perform one or more functions described herein and/or one or more databases that may store and/or otherwise maintain information which may be used by such program modules and/or processor 111. In some instances, the one or more program modules and/or databases may be stored by and/or maintained in different memory units of collaborative meeting authorization platform 102 and/or by different computing devices that may form and/or otherwise make up collaborative meeting authorization platform 102. For example, memory 112 may have, host, store, and/or include collaborative meeting authorization module 112*a*, collaborative meeting authorization database 112*b*, and/or a machine learning engine 112*c*.

Collaborative meeting authorization module 112*a* may have instructions that direct and/or cause collaborative meeting authorization platform 102 to prevent unauthorized participation in enhanced reality experiences, as discussed in greater detail below. Collaborative meeting authorization database 112*b* may store information used by collaborative meeting authorization module 112*a* and/or collaborative meeting authorization platform 102 in application of advanced techniques to prevent unauthorized participation in enhanced reality experiences, and/or in performing other functions. Machine learning engine 112*c* may be used to train, host, and/or otherwise maintain a machine learning model that may be used by the collaborative meeting authorization module 112*a* and/or collaborative meeting authorization platform 102 to prevent unauthorized participation in enhanced reality experiences.

Figure 2A:
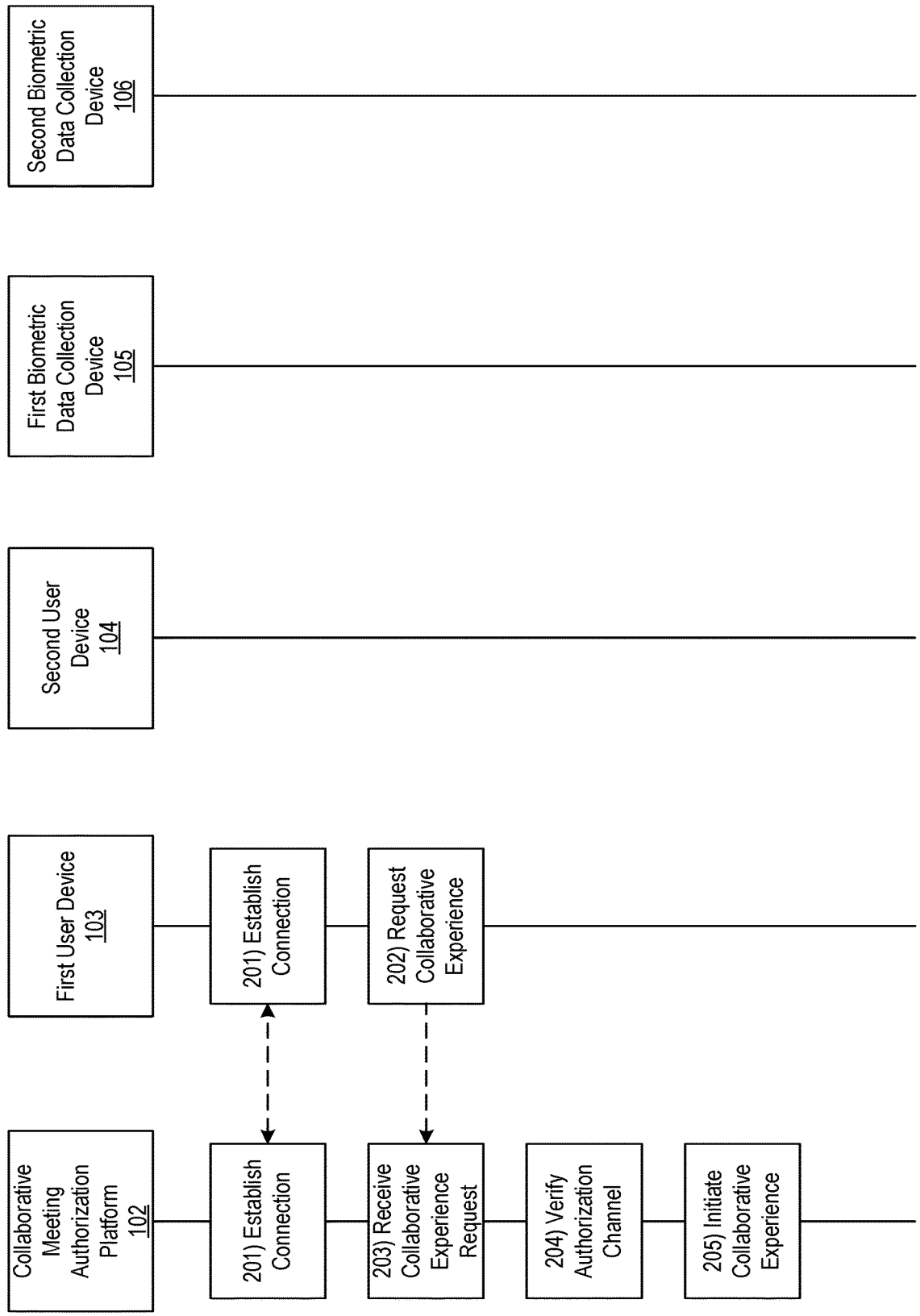
FIGS. 2A-2E depict an illustrative event sequence for preventing unauthorized participation in collaborative AR and VR experiences in accordance with one or more example embodiments.

FIGS. 2A-2E depict an illustrative event sequence for preventing unauthorized participation in collaborative AR and VR experiences in accordance with one or more example embodiments. Referring to FIG. 2A, at step 201, the first user device 103 may establish a connection with the collaborative meeting authorization platform 102. For example, the first user device 103 may establish a first wired/wireless data connection with the collaborative meeting authorization platform 102 to link the first user device 103 to the collaborative meeting authorization platform 102 (e.g., in preparation for requesting a collaborative enhanced reality experience). In some instances the first user device 103 may identify whether or not a connection is already established with the collaborative meeting authorization platform 102. If a connection is already established with the collaborative meeting authorization platform 102, the first user device 103 might not re-establish the connection. If a connection is not yet established with the collaborative meeting authorization platform 102, the first user device 103 may establish the first wired/wireless data connection as described herein.

At step 202, the first user device 103 may send a collaborative experience request to the collaborative meeting authorization platform 102. For example, the first user device 103 may send a request to establish a virtual meeting, a virtual training session, a test taking session, a collaborative academic session, or other collaborative session, any of which may involve the use of enhanced reality (e.g., AR, VR, and/or other enhanced reality technology). In some instances, the first user device 103 may send a request to establish a collaborative experience that involves the use of avatars to represent the physical appearance of one or more participants. In some instances, the first user device 103 may send the request for the collaborative enhanced reality experience to the collaborative meeting authorization platform 102 while the first wired/wireless data connection is established.

At step 203, the collaborative meeting authorization platform 102 may receive the collaborative experience request sent at step 202. For example, the collaborative meeting authorization platform 102 may receive the collaborative experience request via the communication interface 113 and while the first wired/wireless data connection is established.

At step 204, the collaborative meeting authorization platform 102 may verify an authorization channel for the first user device 103. For example, the collaborative meeting authorization platform 102 may authorize the first user device 103 based on a user identifier, device identifier, authentication token, and/or other authentication mechanism, which may have been received along with the collaborative experience request. In some instances, in verifying the authentication channel, the collaborative meeting authorization platform 102 may verify an authentication channel that is specific to the first user device 103 and that is independent of quality on a 5G network over which the collaborative experience request was sent. If the collaborative meeting authorization platform 102 verifies the authentication channel for the first user device 103, the collaborative meeting authorization platform 102 may proceed to step 205. Otherwise, if the collaborative meeting authorization platform 102 does not verify the authentication channel for the first user device 103, the collaborative meeting authorization platform 102 might not proceed to step 205, and may instead await a subsequent request to initiate another collaborative experience.

At step 205, the collaborative meeting authorization platform 102 may initiate the collaborative experience requested by the first user device 103. For example, the collaborative meeting authorization platform 102 may establish a virtual meeting, a virtual training session, a test taking session, a collaborative academic session, or other collaborative session, any of which may involve the use of enhanced reality (e.g., AR, VR, and/or other enhanced reality technology). In some instances, in initiating the collaborative experience, the collaborative meeting authorization platform 102 may configure the collaborative experience for participation by a user of the first user device 103 (e.g., a first user), which may, in some instances, involve the use of an avatar, representative of the first user, displayed within the collaborative experience. In some instances, in initiating the collaborative experience, the collaborative meeting authorization platform 102 may initiate the collaborative experience on a 5G network.

Figure 2B:
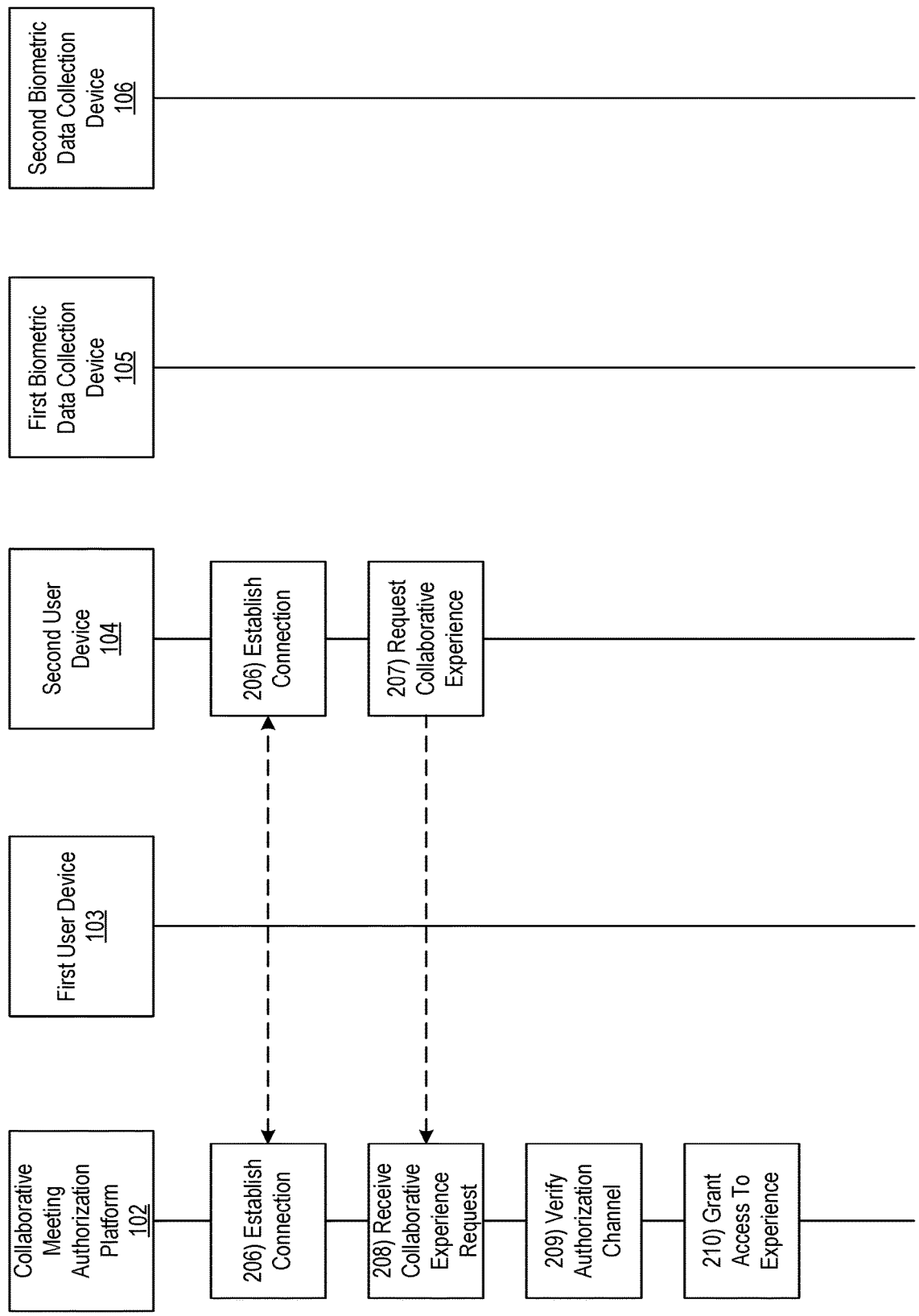

Referring to FIG. 2B, at step 206, the second user device 104 may establish a connection with the collaborative meeting authorization platform 102. For example, the second user device 104 may establish a second wired/wireless data connection with the collaborative meeting authorization platform 102 to link the second user device 104 to the collaborative meeting authorization platform 102 (e.g., in preparation for sending a request to join the collaborative experience). In some instances, the second user device 104 may identify whether or not a connection is already established with the collaborative meeting authorization platform 102. If a connection is already established with the collaborative meeting authorization platform 102, the second user device 104 might not re-establish the connection. If a connection is not yet established with the collaborative meeting authorization platform 102, the second user device 104 may establish the second wired/wireless data connection as described herein.

At step 207, the second user device 104 may send a collaborative experience request to the collaborative meeting authorization platform 102. For example, the second user device 104 may send a request to join the collaborative experience established at step 205. In some instances, the second user device 104 may send the collaborative experience request to the collaborative meeting authorization platform 102 while the second wired/wireless data connection is established.

At step 208, the collaborative meeting authorization platform 102 may receive the collaborative experience request sent at step 207. For example, the collaborative meeting authorization platform 102 may receive the collaborative experience request via the communication interface 113 and while the second wired/wireless data connection is established.

At step 209, the collaborative meeting authorization platform 102 may verify an authorization channel for the second user device 104. For example, the collaborative meeting authorization platform 102 may authorize the second user device 104 based on a user identifier, device identifier, authentication token, and/or other authentication mechanism, which may have been received along with the request to join the collaborative experience. In some instances, in verifying the authentication channel, the collaborative meeting authorization platform may verify an authentication channel that is specific to the second user device 104 and that is independent of quality on a 5G network over which the collaborative experience request was sent. If the collaborative meeting authorization platform 102 verifies the authentication channel for the second user device 104, the collaborative meeting authorization platform 102 may proceed to step 210. Otherwise, if the collaborative meeting authorization platform 102 does not verify the authentication channel for the second user device 104, the collaborative meeting authorization platform 102 might not proceed to step 210, and may instead await a subsequent request to join the collaborative experience and/or otherwise monitor participants of the collaborative experience as described further below.

At step 210, the collaborative meeting authorization platform 102 may admit a user of the second user device (a second user) to the collaborative experience. For example, the collaborative meeting authorization platform 102 may admit the second user to a virtual meeting, a virtual training session, a test taking session, a collaborative academic session, or other collaborative session, any of which may involve the use of enhanced reality (e.g., AR, VR, and/or other enhanced reality technology). In some instances, in admitting the second user to the collaborative experience, the collaborative meeting authorization platform 102 may configure the collaborative experience for participation by the second user, which may, in some instances, involve the use of an avatar, representative of the second user, displayed within the collaborative experience. In some instances, in initiating the collaborative experience, the collaborative meeting authorization platform 102 may initiate the collaborative experience on a 5G network.

Figure 2C:
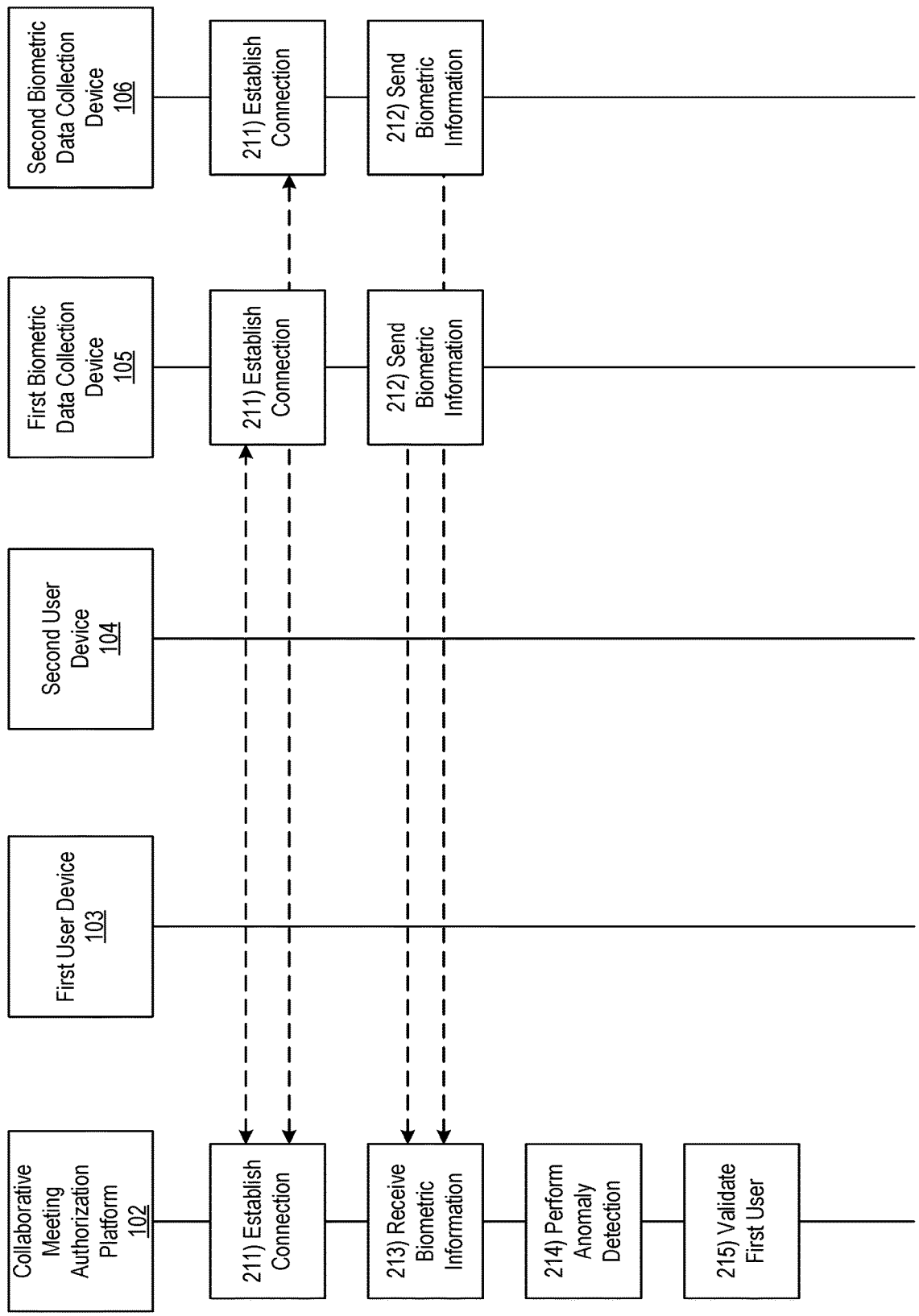

Referring to FIG. 2C, at step 211, first biometric data collection device 105 and/or the second biometric data collection device 106 may establish a connection with the collaborative meeting authorization platform 102. For example, the first biometric data collection device 105 and/or the second biometric data collection device 106 may establish a third and/or fourth wired/wireless data connection with the collaborative meeting authorization platform 102 to link the first biometric data collection device 105 and/or the second biometric data collection device 106 (e.g., in preparation for sending biometric information). In some instances, rather than directly connecting to the collaborative meeting authorization platform 102, the first biometric data collection device 105 and/or second biometric data collection device 106 may establish a connection with the first user device 103 and/or second user device 104, respectively. In these instances, the first biometric data collection device 105 and/or second biometric data collection device 106 may send the biometric information to the first user device 103 and/or second user device 104, which may then send the biometric information to the collaborative meeting authorization platform 102. In some instances, the first biometric data collection device 105 and/or the second biometric data collection device 106 may identify whether a connection is already established with the collaborative meeting authorization platform 102. If a connection is already established with the collaborative meeting authorization platform 102, the first biometric data collection device 105 and/or the second biometric data collection device 106 might not re-establish the connection. If a connection is not yet established with the collaborative meeting authorization platform 102, the first biometric data collection device 105 and/or the second biometric data collection device 106 may establish the third and/or fourth wired/wireless data connection as described herein.

At step 212, the first biometric data collection device 105 and/or the second biometric data collection device 106 may send biometric data to the collaborative meeting authorization platform 102 (either directly or via the first user device 103 and/or second user device 104 respectively). For example, the first biometric data collection device 105 may send biometric data corresponding to the first user and the second biometric data collection device 106 may send biometric data corresponding to the second user. In some instances, the first biometric data collection device 105 and/or the second biometric data collection device 106 may send the biometric information to the collaborative meeting authorization platform 102 while the third and/or fourth wired/wireless data connection is established. In some instances, the first biometric data collection device 105 and/or the second biometric data collection device 106 may implement computer interface, XRSI, and/or other biometrics technology in data collection/transmittal.

In some instances, in addition or as an alternative to the biometric information send by the first biometric data collection device 105 and/or the second biometric data collection device 106, the first user device 103 and/or the second user device 104 may send interaction information for the first user and/or the second user, which may, e.g., include video data, audio data, image data, and/or other information, indicating or otherwise corresponding to interactions of the first and/or second user within the collaborative experience.

At step 213, the collaborative meeting authorization platform 102 may receive the biometric information and/or interaction information sent at step 212. For example, the collaborative meeting authorization platform 102 may receive the biometric information via the communication interface 113 and while the third and/or fourth wired/wireless data connections are established. For example, in receiving the biometric information and/or interaction information, the collaborative meeting authorization platform 102 may receive information indicating: avatar hand movements, avatar dominant hands, running gaits of the avatars, head turning motions of the avatars, speech patterns, eye movements, and/or other information indicating interactions, movements, and/or other data corresponding to the first user, the second user, and/or any other participants in the collaborative experience.

At step 214, the collaborative meeting authorization platform 102 may feed the biometric information and/or the other interaction information into an anomaly detection model. For example, the collaborative meeting authorization platform 102 may have previously trained a machine learning model using historical biometric and/or interaction information for a plurality of individuals (e.g., including the first user and the second user). In some instances, users may opt in to the collaborative meeting authorization service, and may provide initial interaction and/or biometric information through the creation of a user profile. In some instances, the collaborative meeting authorization platform 102 may prompt users for different amounts/types of information in the user profiles based on services requested by the corresponding users. Once this initial information is used to train the machine learning model, the collaborative meeting authorization platform 102 may collect additional information throughout various user interactions going forward, and may use this information to further train and/or otherwise refine the machine learning model/baselines accordingly (as described further below). In training the machine learning model, the collaborative meeting authorization platform 102 may identify baseline values/patterns of avatar hand movements, avatar dominant hands, running gaits of the avatars, head turning motions of the avatars, speech patterns, eye movements, and/or other information indicating interactions, movements, and/or other data corresponding to the first user, the second user, and/or any of the remaining plurality of individuals. Accordingly, the collaborative meeting authorization platform 102 may configure the machine learning model to identify anomalies in behavior or biometrics for participants in various collaborative experiences.

For example, the collaborative meeting authorization platform 102 may identify whether any of the above described metrics are outside of a predetermined tolerance window when compared to the particular individual's baseline. If any of the above described metrics are outside of the predetermined tolerance window, the collaborative meeting authorization platform 102 may identify an anomaly for the corresponding user. If none of the above described metrics are outside of the predetermined tolerance window, the collaborative meeting authorization platform 102 may identify that no anomalous behavior has been detected for the corresponding user.

Although the receipt of information and performance of the anomaly detection is described with regard to steps 212-214 above, these processes may be continuous and dynamic throughout a duration of the collaborative experience. For example, data/information corresponding to participants may be continuously received and analyzed to detect any anomalies (e.g., not merely once upon admittance to the collaborative experience). Similarly, as additional data/information is received, the collaborative meeting authorization platform 102 may use this additional data/information to dynamically refine/update the machine learning model to improve its performance, accuracy, and capabilities over time.

Such detection may be important, for example, because in such collaborative experiences, as described above, individuals might not be observable themselves within the collaborative experience (e.g., as they would be in a conventional video call). For example, each individual may be represented by an avatar, and thus it may be easier for an unauthorized individual to pose as an authorized individual (because only a corresponding avatar may be visible rather than an image of the individual themselves). Accordingly, such analysis may enable the identification of anomalous behavior, regardless of the use of the avatars, and appropriate action may be taken accordingly (as described further below) to prevent unauthorized individuals from covertly accessing private collaborative experiences.

At step 215, the collaborative meeting authorization platform 102 may identify that the first user is valid or otherwise authorized (e.g., an individual represented by an avatar of the first user is in fact the first user). For example, based on the results of the machine learning model, the collaborative meeting authorization platform 102 may identify that one or more types of data, information, and/or other patterns are within an acceptable tolerance window of baseline data, information, and/or patterns for the first user. Accordingly, the collaborative meeting authorization platform 102 might maintain the first user's access to the collaborative experience (e.g., allow the first user to remain within the collaborative experience).

Figure 2D:
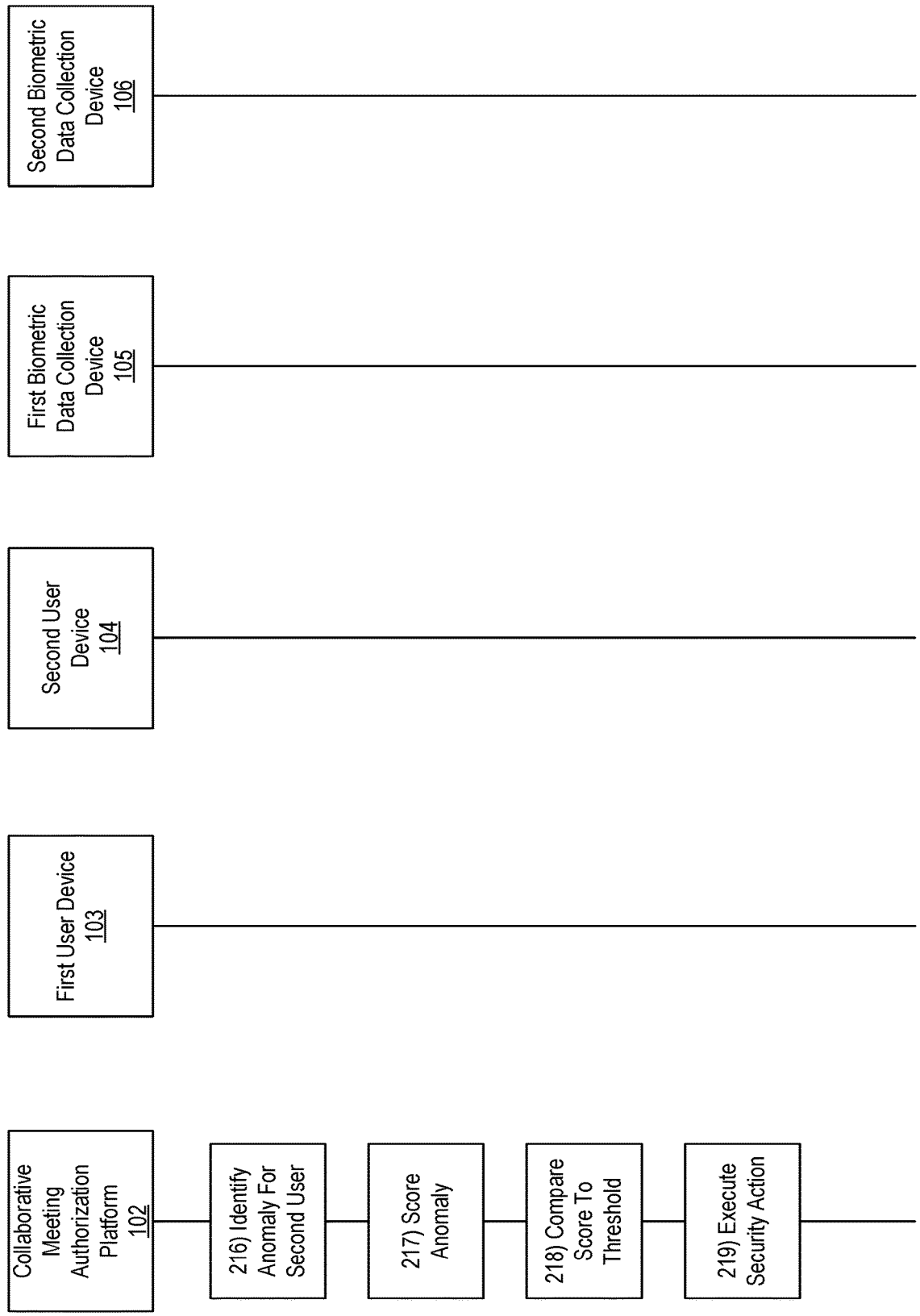

Referring to FIG. 2D, at step 216, the collaborative meeting authorization platform 102 may identify that the second user is not valid or is otherwise unauthorized (e.g., an individual represented by an avatar of the second user is in fact the second user). For example, based on the results of the machine learning model, the collaborative meeting authorization platform 102 may identify that one or more types of data, information, and/or other patterns are outside of an acceptable tolerance window of baseline data, information, and/or patterns for the second user. Accordingly, the collaborative meeting authorization platform 102 might identify that anomalous behavior has been detected for the second user.

At step 217, the collaborative meeting authorization platform 102 may score the detected anomaly. For example, the collaborative meeting authorization platform 102 may score the detected anomaly based on, for example, a standard deviation (or number of standard deviations) of the detected anomaly when compared to the corresponding baseline. For example, the collaborative meeting authorization platform 102 may assign a score based on the corresponding number of standard deviations. For example, the collaborative meeting authorization platform 102 may apply the following model to score the anomaly:

$$\text{anomaly score} = \sqrt{\frac{\sum (x_i - \mu)^2}{N}}.$$

In these instances, N may represent a data points used to establish the corresponding baseline value plus one (e.g., plus an extra data point representative of the newly received data), $\mu$ may represent the previously identified baseline value for the corresponding metric (which may e.g., be an average), and $x_i$ may represent a value of the newly received data.

In some instances, the collaborative meeting authorization platform 102 may use these individually identified anomaly scores to establish dynamic and comprehensive compliance scores for each participant in the collaborative experience. In some of these instances, the comprehensive score may be compared to a predetermined security threshold as described below, and security actions may be taken accordingly. In these instances, the comparison of the comprehensive scores may be performed in addition to or as an alternative to the comparison of the specific anomaly scores.

At step 218, the collaborative meeting authorization platform 102 may compare the anomaly score, identified at step 218, to a predetermined security threshold. For example, the collaborative meeting authorization platform 102 may perform the comparison using the model:

$$\sqrt{\frac{\sum (x_i - \mu)^2}{N}} \geq 1,$$

then anomaly detected and if $$\sqrt{\frac{\sum (x_i - \mu)^2}{N}} < 1,$$

no anomaly detected. If the collaborative meeting authorization platform 102 identifies that the anomaly score meets or exceeds the security threshold, the collaborative meeting authorization platform 102 may proceed to step 219. Otherwise, if the collaborative meeting authorization platform 102 identifies that the anomaly score does not exceed the security threshold, it may proceed to step 223.

At step 219, based on or in response to detecting that the anomaly score met or exceeded the security threshold, the collaborative meeting authorization platform 102 may perform one or more security actions. For example, the collaborative meeting authorization platform 102 may remove the second user from the enhanced reality collaborative experience, move the second user to a waiting room of the enhanced reality collaborative experience, prompt the second user to re-authenticate to the enhanced reality collaborative experience, and/or perform one or more other security actions.

Figure 2E:
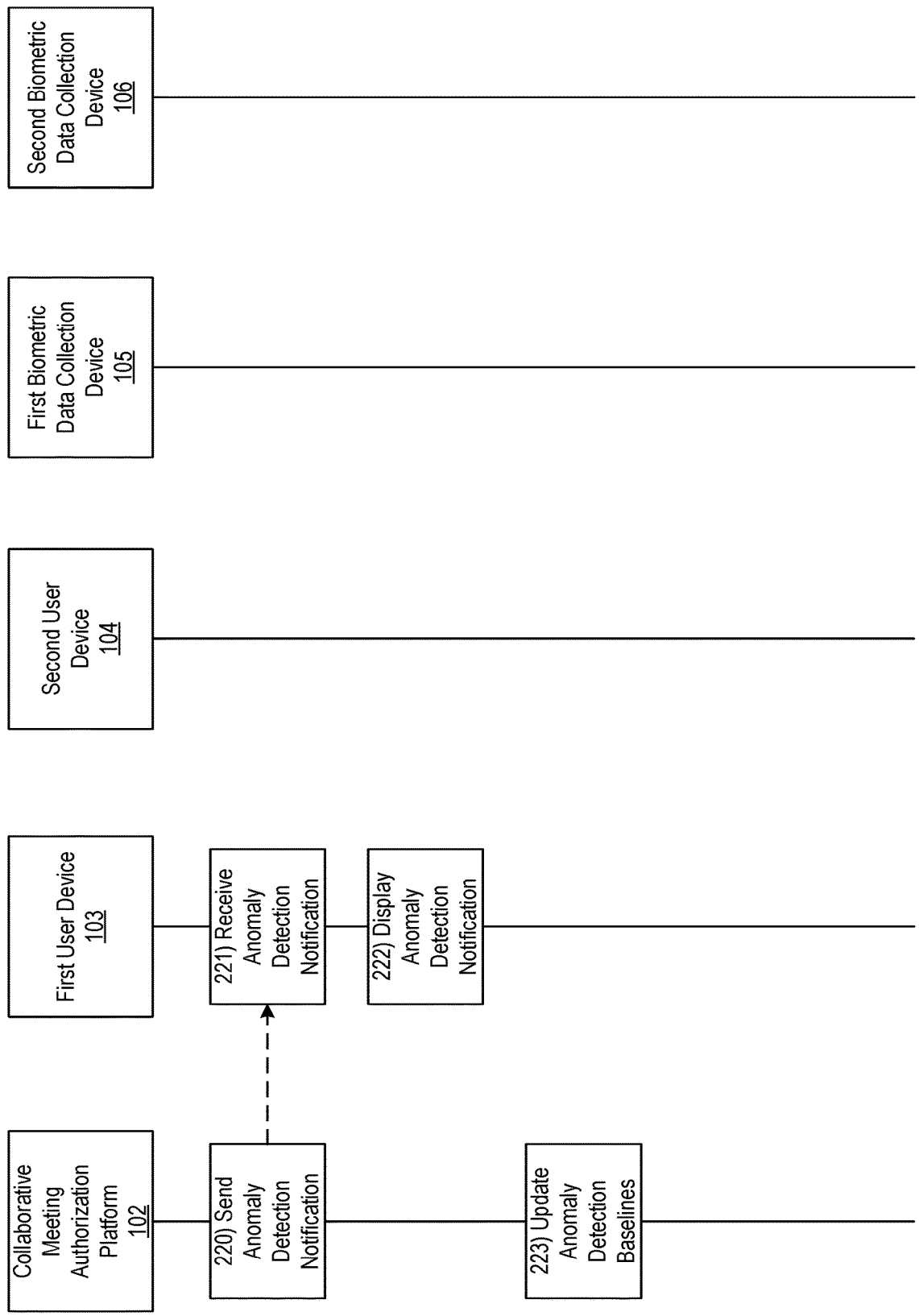

Referring to FIG. 2E, at step 220, the collaborative meeting authorization platform 102 may sending a notification to a host (e.g., the first user) of the enhanced reality collaborative experience (or other network/security analyst) indicating the detected one or more anomalies. In some instances, the collaborative meeting authorization platform 102 may also send one or more commands directing the first user device 103 to display the anomaly detection notification. For example, the collaborative meeting authorization platform 102 may send the notification to the first user device 103 via the communication interface 113 and while the first wired/wireless data connection is established.

At step 221, the first user device 103 may receive the anomaly detection notification sent at step 220. For example, the first user device 103 may receive the anomaly detection notification while the first wired/wireless data connection is established. In some instances, the first user device 103 may also receive one or more commands directing the first user device 103 to display the anomaly detection notification.

Figure 4:
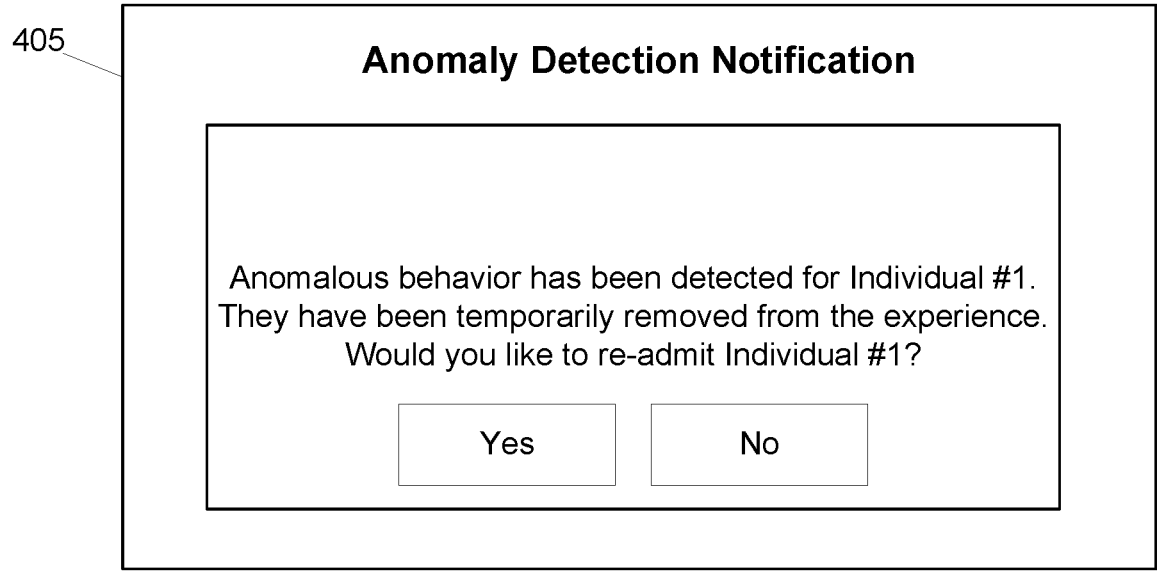
FIG. 4 depicts an illustrative graphical user interface for preventing unauthorized participation in collaborative AR and VR experiences in accordance with one or more example embodiments.

At step 222, based on or in response to the one or more commands directing the first user device 103 to display the anomaly detection notification, the first user device 103 may display the anomaly detection notification. For example, the first user device 103 may display a graphical user interface similar to graphical user interface 405, which is shown in FIG. 4, and which may, for example, indicate that an anomaly has been detected for the second user and prompt the host of the collaborative experience (e.g., the first user) to re-admit the second user if an error was made.

At step 223, the collaborative meeting authorization platform 102 may update one or more anomaly detection baselines based on any received data, patterns, or other information, and any results/outputs from the machine learning model. In doing so, the collaborative meeting authorization platform 102 may continue to iteratively update/refine the machine learning model to improve accuracy of its predictions/analysis over time and account for any drift in preferences/habits of any corresponding individuals.

Although a first and second user are described, this is for illustrative purposes only, and any number of individuals may be involved in the above described method without departing from the scope of this disclosure. Furthermore, although identification of unauthorized users is described above, the above described systems and methods may be used to identify behavior that violates a code of conduct for a collaborative virtual experience or is otherwise aggressive/passionate and merits removal/suspension from the experience, without departing from the scope of this disclosure. For example, the collaborative meeting authorization platform 102 may identify use of profanity and/or other inappropriate behavior. In these instances, the above described security actions may be performed as a result.

Figure 3:
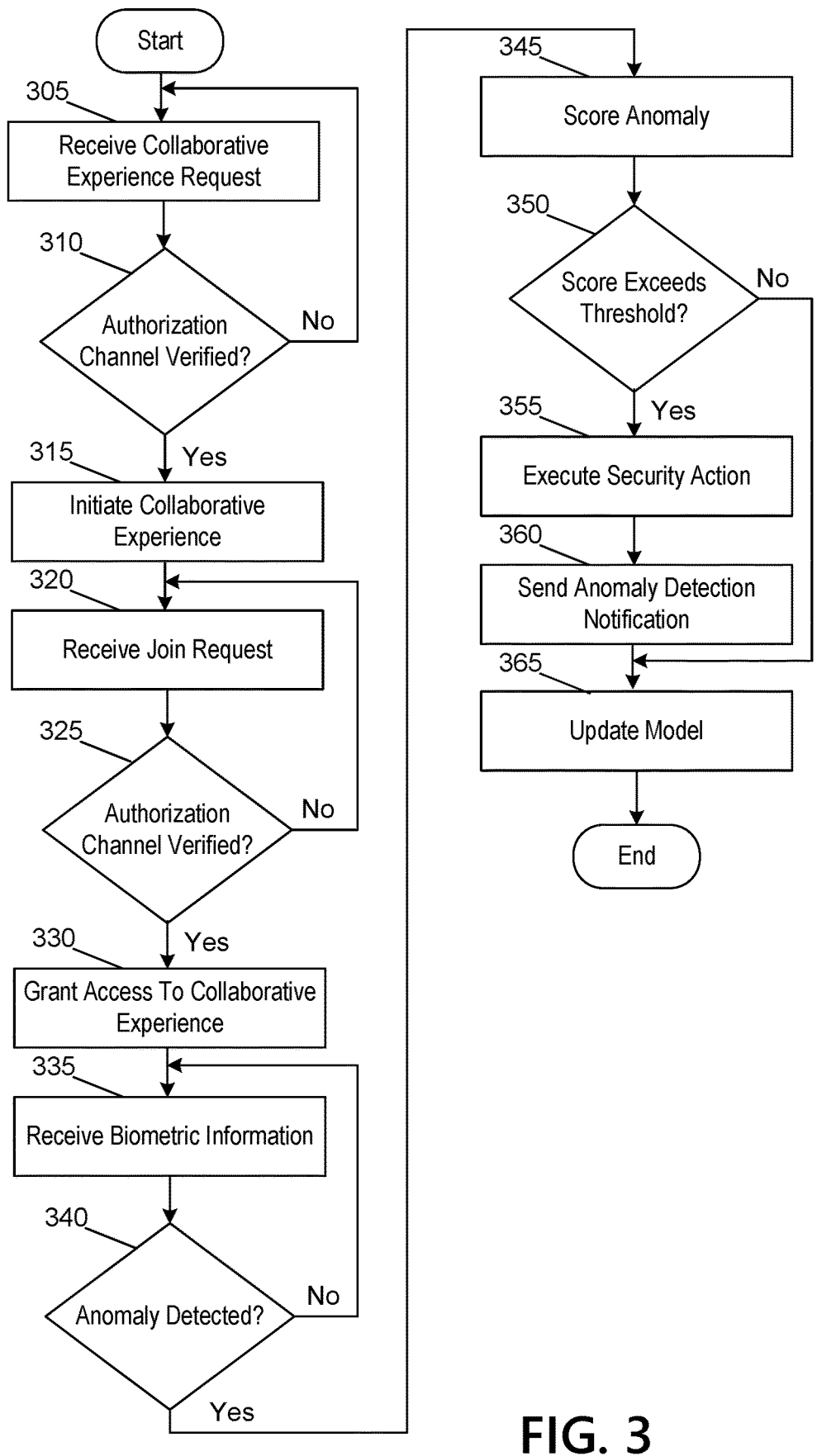
FIG. 3 depicts an illustrative method for preventing unauthorized participation in collaborative AR and VR experiences in accordance with one or more example embodiments.

FIG. 3 depicts an illustrative method for preventing unauthorized participation in collaborative AR and VR experiences in accordance with one or more example embodiments. Referring to FIG. 3, at step 305, a computing platform having at least one processor, a communication interface, and memory may receive a request to initiate a collaborative experience. At step 310, the computing platform may verify an authorization channel corresponding to the request. If the computing platform identifies that the authorization channel corresponding to the request is verified, the computing platform may proceed to step 315. If the computing platform identifies that the authorization channel is not verified, it may return to step 305 to await another collaborative experience request.

At step 315, the computing platform may initiate the requested collaborative experience. At step 320, the computing platform may receive a request to join the collaborative experience. At step 325, the computing platform may identify whether an authentication channel corresponding to the join request is verified. If the computing platform identifies that the authentication channel corresponding to the join request is not verified, it may return to step 320 until another join request is received. If the computing platform identifies that the authentication channel is verified, it may proceed to step 330.

At step 330, the computing platform may grant access to the collaborative experience. At step 335, the computing platform may receive biometric and/or other information corresponding to participants in the collaborative experience. At step 340, the computing platform may input the biometric and/or other information into an anomaly detection model to identify whether or not anomalous behavior is detected. If the computing platform does not detect anomalous behavior, it may return to step 335 to receive further information from the participants. If the computing platform does detect an anomaly, it may proceed to step 345.

At step 345, the computing platform may score the detected anomaly. At step 350, the computing platform may compare the anomaly score to a security threshold. If the computing platform identifies that the score does not exceed the security threshold, it may proceed to step 365. If the computing platform identifies that the score does meet or exceed the security threshold, it may proceed to step 355.

At step 355, the computing platform may execute a security action. At step 360, the computing platform may send an anomaly detection notification to a host of the collaborative experience. At step 365, the computing platform may update the machine learning model based on any newly received data, information, and/or patterns of the participants, and/or the results of the machine learning analysis.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:
1. A computing platform comprising:
at least one processor;
a communication interface communicatively coupled to the at least one processor; and
memory storing computer-readable instructions that, when executed by the at least one processor, cause the computing platform to:
receive, from a user device, a request to join an enhanced reality collaborative experience involving use of an avatar in an augmented reality environment;
verify an authorization channel for the user device;
grant the user device access to the enhanced reality collaborative experience;

receive, from a biometric data collection device of a user of the user device, biometric information corresponding to the user;

perform, using data collected by the user device and the biometric information corresponding to the user received from the biometric data collection device, anomaly detection to detect one or more anomalies in the avatar's participation in the enhanced reality collaborative experience from anticipated participation behaviors of a valid user of the avatar, wherein detecting the one or more anomalies comprises:

feeding video data of the enhanced reality collaborative experience into an anomaly detection model, identifying, using the anomaly detection model, that the video data includes anomalous movement patterns for the user, scoring the anomalous movement patterns based on a number of standard deviations between the anomalous movement patterns and a corresponding baseline, wherein scoring the anomalous movement patterns comprises applying a model comprising:

$$\text{anomaly score} == \sqrt{\frac{\sum (x_i - \mu)^2}{N}},$$

wherein:
N comprises a number of data points used to establish the baseline value plus one,
μ comprises the corresponding baseline, and
$x_i$ comprises a value of the data, and identifying that the score meets or exceeds a predetermined security threshold; and in response to detecting the one or more anomalies in the avatar's participation in the enhanced reality collaborative experience, perform one or more security actions for the enhanced reality collaborative experience.

2. The computing platform of claim 1, wherein the biometric data collection device is connected to the user device, and wherein receiving the biometric information corresponding to the user comprises receiving, from the user device, the biometric information corresponding to the user.

3. The computing platform of claim 1, wherein receiving the biometric information corresponding to the user comprises receiving, directly from the biometric data collection device, the biometric information corresponding to the user.

4. The computing platform of claim 1, wherein performing the one or more security actions comprises one or more of: removing the user from the enhanced reality collaborative experience, moving the user to a waiting room of the enhanced reality collaborative experience, or prompting the user to re-authenticate to the enhanced reality collaborative experience.

5. The computing platform of claim 1, wherein the data collected by the user device comprises one or more of: video data, image data, or audio data.

6. The computing platform of claim 1, wherein the memory stores additional computer-readable instructions that, when executed by the at least one processor, cause the computing platform to:

receive historical biometric and pattern information for the user; and train, using the historical biometric and pattern information for the user, the anomaly detection model to identify differences between baseline biometric and pattern information for the user and received biometric and pattern information for the user, wherein detecting the one or more anomalies comprises identifying the differences between:

the baseline biometric and pattern information for the user, and the data collected by the user device and the biometric information corresponding to the user.

7. The computing platform of claim 1, wherein the computing platform continuously, throughout a duration of the enhanced reality collaborative experience and for all participants of the enhanced reality collaborative experience:

receives biometric information and other data corresponding to the participants, and performs anomaly detection for the participants.

8. The computing platform of claim 1, wherein the enhanced reality collaborative experience comprises one of: a virtual training session, or a test taking session.

9. The computing platform of claim 1, wherein performing the anomaly detection comprises analyzing one or more of: hand movement of the avatar, a dominant hand of the avatar, a running gait of the avatar, a head turn motion of the avatar, or speech patterns of the user.

10. A method comprising:
at a computing platform comprising at least one processor, a communication interface, and memory:

receiving, from a user device, a request to join an enhanced reality collaborative experience involving use of an avatar in one of: a virtual reality environment or an augmented reality environment;

verifying an authorization channel for the user device;

granting the user device access to the enhanced reality collaborative experience;

receiving, from a biometric data collection device of a user of the user device, biometric information corresponding to the user;

performing, using data collected by the user device and the biometric information corresponding to the user received from the biometric data collection device, anomaly detection to detect one or more anomalies in the avatar's participation in the enhanced reality collaborative experience from anticipated participation behaviors of a valid user of the avatar, wherein detecting the one or more anomalies comprises:

feeding video data of the enhanced reality collaborative experience into an anomaly detection model, identifying, using the anomaly detection model, that the video data includes anomalous movement patterns for the user, scoring the anomalous movement patterns based on a number of standard deviations between the anomalous movement patterns and a corresponding baseline, wherein scoring the anomalous movement patterns comprises applying a model comprising:

$$\text{anomaly score} == \sqrt{\frac{\sum (x_i - \mu)^2}{N}},$$

wherein:
N comprises a number of data points used to establish the baseline value plus one, μ comprises the corresponding baseline, and $x_i$ comprises a value of the data, and identifying that the score meets or exceeds a predetermined security threshold; and in response to detecting the one or more anomalies in the avatar's participation in the enhanced reality collaborative experience, performing one or more security actions for the enhanced reality collaborative experience.

11. The method of claim 10, wherein the biometric data collection device is connected to the user device, and wherein receiving the biometric information corresponding to the user comprises receiving, from the user device, the biometric information corresponding to the user.

12. The method of claim 10, wherein receiving the biometric information corresponding to the user comprises receiving, directly from the biometric data collection device, the biometric information corresponding to the user.

13. The method of claim 10, wherein performing the one or more security actions comprises one or more of: removing the user from the enhanced reality collaborative experience, moving the user to a waiting room of the enhanced reality collaborative experience, or prompting the user to re-authenticate to the enhanced reality collaborative experience.

14. The method of claim 10, wherein the data collected by the user device comprises one or more of: video data, image data, or audio data.

15. The method of claim 10, further comprising:

receiving historical biometric and pattern information for the user; and training, using the historical biometric and pattern information for the user, the anomaly detection model to identify differences between baseline biometric and pattern information for the user and received biometric and pattern information for the user, wherein detecting the one or more anomalies comprises identifying the differences between:

the baseline biometric and pattern information for the user, and the data collected by the user device and the biometric information corresponding to the user.

16. The method of claim 10, wherein the computing platform continuously, throughout a duration of the enhanced reality collaborative experience and for all participants of the enhanced reality collaborative experience:

receives biometric information and other data corresponding to the participants, and performs anomaly detection for the participants.

17. The method of claim 10, wherein the enhanced reality collaborative experience comprises one of: a virtual training session, or a test taking session.

18. One or more non-transitory computer-readable media storing instructions that, when executed by a computing platform comprising at least one processor, a communication interface, and memory, cause the computing platform to:

receive, from a user device, a request to join an enhanced reality collaborative experience involving use of an avatar in one of: a virtual reality environment or an augmented reality environment;

verify an authorization channel for the user device;

grant the user device access to the enhanced reality collaborative experience;

receive, from a biometric data collection device of a user of the user device, biometric information corresponding to the user;

perform, using data collected by the user device and the biometric information corresponding to the user received from the biometric data collection device, anomaly detection to detect one or more anomalies in the avatar's participation in the enhanced reality collaborative experience from anticipated participation behaviors of a valid user of the avatar, wherein detecting the one or more anomalies comprises:

feeding video data of the enhanced reality collaborative experience into an anomaly detection model, identifying, using the anomaly detection model, that the video data includes anomalous movement patterns for the user, scoring the anomalous movement patterns based on a number of standard deviations between the anomalous movement patterns and a corresponding baseline, wherein scoring the anomalous movement patterns comprises applying a model comprising:

$$\text{anomaly score} == \sqrt{\frac{\sum(x_i - \mu)^2}{N}},$$

wherein:

N comprises a number of data points used to establish the baseline value plus one, μ comprises the corresponding baseline, and $x_i$ comprises a value of the data, and identifying that the score meets or exceeds a predetermined security threshold; and in response to detecting the one or more anomalies in the avatar's participation in the enhanced reality collaborative experience, perform one or more security actions for the enhanced reality collaborative experience.

* * * * *